US012706804B2

(12) United States Patent
Liu

(10) Patent No.: US 12,706,804 B2

(45) Date of Patent: Aug. 11, 2026

(54) APPLICATION STATE NETWORK CARD DRIVING METHOD AND APPARATUS

(71) Applicant: NANJING QINHENG MICROELECTRONICS CO., LTD., Nanjing (CN)

(72) Inventor: Shuai Liu, Nanjing (CN)

(73) Assignee: NANJING QINHENG MICROELECTRONICS CO., LTD., Nanjing (CN)

(*) Notice: Subject to any disclaimer, the term of this patent is extended or adjusted under 35 U.S.C. 154(b) by 84 days.

(21) Appl. No.: 18/898,756

(22) Filed: Sep. 27, 2024

(65) Prior Publication Data

US 2025/0211482 A1 Jun. 26, 2025

(51) Int. Cl.

| | |
|---|---|
| ***H04L 41/0895*** | (2022.01) |
| ***H04L 12/46*** | (2006.01) |
| ***H04L 41/0806*** | (2022.01) |
| ***H04L 41/0816*** | (2022.01) |
| ***H04L 41/40*** | (2022.01) |

(52) U.S. Cl.

CPC ...... *H04L 41/0809* (2013.01); *H04L 12/4641* (2013.01); *H04L 41/0816* (2013.01); *H04L 41/0895* (2022.05); *H04L 41/40* (2022.05)

(58) Field of Classification Search

CPC ............. H04L 41/0809; H04L 12/4641; H04L 41/0816; H04L 41/0895; H04L 41/40; H04L 67/51; G06F 9/4411

See application file for complete search history.

(56) References Cited

U.S. PATENT DOCUMENTS

| | | | | |
|---|---|---|---|---|
| 2017/0078336 | A1* | 3/2017 | Aluvala | H04L 65/1069 |
| 2020/0089517 | A1* | 3/2020 | Paul | G06F 9/45558 |

* cited by examiner

*Primary Examiner* — Soe Hlaing

(74) *Attorney, Agent, or Firm* — CBM PATENT CONSULTING, LLC

(57) ABSTRACT

Disclosed are an application state network card driving method and apparatus. The method comprises the steps of: initializing a system, establishing a channel communicating with a physical network card hardware device, creating a virtual network card device in the system, and opening the physical network card hardware device channel and a virtual network card device node channel; downstream transmitting data received by a system network interface through the virtual network card device, and uploading data uploaded by the physical network card hardware device to the system network interface; and stopping node communication of the virtual network card device, and deleting the virtual network card device. According to the invention, a network card driver can be installed on a host system without needing a root permission, thus having a good compatibility and a wide application range.

10 Claims, 5 Drawing Sheets

APPLICATION STATE NETWORK CARD DRIVING METHOD AND APPARATUS

CROSS-REFERENCE TO RELATED APPLICATIONS

This application claims priority to Chinese Patent Application Ser. No. CN202311789792.0 filed on 25 Dec. 2023.

TECHNICAL FIELD

The present invention belongs to the technical field of network card drivers, and particularly relates to an application state network card driving method and apparatus.

BACKGROUND

In the prior art, after a network card accesses to a host, a system kernel will be matched with a corresponding network card driver, and when the kernel driver is loaded, network attributes may be set normally and a network communication function may be used.

However, for some Android system hosts, such as smart TV, in order to reduce a system kernel volume, simplify a system complexity and improve a system running speed, an operating system of the device will be customized and tailored, and some kernel driving programs, such as a network card driving program, will be reduced. At this time, the device is not integrated with network card drivers such as ECM or network card manufacturer divers. However, most of root permissions of the system are not open, and it is impossible to install a kernel-mode network card driver. It's very likely to occur that the driver cannot be installed normally after the network card accesses to the host in the above environment, especially for some network cards with special functions, such as those with network access authentication.

SUMMARY

Object of invention: in order to solve the problem in the prior art that the installation of a driver by allowing a network card access to a host is limited, the present invention provides an application state network card driving method and apparatus.

Technical solution: an application state network card driving method comprises the following steps of:

initializing a system;

establishing a physical network card hardware device channel;

creating a virtual network card device, which comprises: opening a VPN service, calling a public interface in an internal class of the VPN service to preset parameters of the virtual network card device, calling a function in the internal class of the VPN service to create the virtual network card device, and saving a virtual network card device node;

opening the physical network card hardware device channel and a virtual network card device node channel;

carrying out data communication between the system and the physical network card hardware device, which comprises: reading, by the virtual network card device, protocol layer packet data in the virtual network card device node, and transmitting the data to the physical network card hardware device through a network protocol interface module and a device interface module in sequence; and receiving, by the device interface module, the data sent by the physical network card hardware device, transmitting the data to the network protocol interface module, then transmitting the data to the virtual network card device through the network protocol interface module, and writing, by the virtual network card device, the data into the virtual network card device node; and deleting the virtual network card device, which comprises: closing the physical network card hardware device channel and the virtual network card device node channel, calling a node closing function in system functions to close the virtual network card device node, and calling a service closing function in the system functions to close the VPN service.

Further, in a communication process, the protocol layer packet data is in transparent transmission among the virtual network card device, the network protocol interface module, the device interface module and the physical network card hardware device.

Further, a communication process further comprises at least one of the following situations:

after the virtual network card device reads the protocol layer packet data in the virtual network card device node, the protocol layer packet data is downstream transmitted through the network protocol interface module, the protocol layer packet data is packaged first, and then the packaged data is transmitted to the physical network card hardware device through the device interface module; and when the data transmitted by the physical network card hardware device is non-protocol layer packet data, the non-protocol layer packet data is uploaded through the device interface module, the non-protocol layer packet data is parsed into the protocol layer packet data first, and then the protocol layer packet data is transmitted to the virtual network card device through the network protocol interface module.

Further, the application state network card driving method further comprises: in the communication process, according to a physical device interface type of the physical network card hardware device, selecting a corresponding data transmission mode for communication.

Further, when the method is applied to an Android system, in the process of creating the virtual network card device, VPNService.Builder which is a public interface of the internal class of the VPN service is called to preset the parameters of the virtual network card device, and VPNService.Builder.Establisho which is a function of the internal class of the VPN service is called to create the virtual network card device.

Further, in the process of deleting the virtual network card device, the node closing function adopts ParcelFileDescriptor interface close( ) in the system functions, and the service closing function adopts stopService( ) in the system functions.

Further, the process of initializing the system further comprises: opening hardware device plugging and unplugging detection, when the hardware device is detected to be plugged, identifying the hardware device, and when the identification is successful, carrying out subsequent operations; and when the hardware device is detected to be unplugged, identifying the hardware device, and when the identification is successful, carrying out subsequent operations.

An application state network card driving apparatus comprises:

- a network card management module configured for controlling a virtual network card device creation module to work, controlling a virtual network card device deletion module to work, controlling a network protocol interface module to work, controlling a device interface module to work, establishing a physical network card hardware device channel, and opening the physical network card hardware device channel and a virtual network card device node channel;
- the virtual network card device creation module configured for opening a VPN service, calling a public interface in an internal class of the VPN service to preset parameters of a virtual network card device, calling a function in the internal class of the VPN service to create the virtual network card device, and saving a virtual network card device node;
- the virtual network card device deletion module configured for stopping node communication of the virtual network card device, calling a node closing function in system functions to close the virtual network card device node, and calling a service closing function in the system functions to close the VPN service;
- the virtual network card device configured for downstream transmitting protocol layer packet data written by a system network into the virtual network card device node, and uploading the protocol layer packet data transmitted by the network protocol interface module to the system network;
- the network protocol interface module configured for downstream transmitting the protocol layer packet data transmitted by the virtual network card device, and uploading the data transmitted by the device interface module to the virtual network card device; and
- the device interface module configured for downstream transmitting the data transmitted by the network protocol interface module to the physical network card hardware device, and uploading the data sent by the physical network card hardware device.

The application state network card driving apparatus further comprises a packet processing module configured for at least one of the following steps of:

- packaging the protocol layer packet data downstream transmitted through the network protocol interface module, and outputting non-protocol layer packet data; and
- parsing the non-protocol layer packet data uploaded through the device interface module, and obtaining the protocol layer packet data.

Further, the application state network card driving apparatus further comprises a device interface type selection module configured for, according to a physical device interface type of the physical network card hardware device, selecting a corresponding data transmission mode for communication.

Further, the network card management module is further configured for detecting the plugging and unplugging of the physical network card hardware device and identifying the physical network card hardware device.

Compared with the prior art, the application state network card driving method and apparatus provided by present invention have the following beneficial effects.

(1) No need for root permission. Most host operating systems have a limitation in providing the root permission to a third-party application. In this method, an application layer driver is adopted, and the virtual network card device node is created by calling the VPN service, without involving a kernel state, so that the root permission of the system is not needed, thus having a wider application range in hosts.

(2) Good compatibility. In this method, the application layer driver is adopted, and the kernel of the host operating system does not need to have a corresponding device driver file, thus having a stronger compatibility and being capable of adapting to more hosts. This driving mode mainly depends on a general function and a standard interface of the host, rather than a driving program of a specific device of the system kernel, which not only improves the compatibility of the device, but also reduces the dependence on the kernel of the operating system of the device.

(3) Coexistence of Wi-Fi of system and wired connections. For the mode of using the system kernel driver, when accessing to a network, many hosts will automatically turn off the Wi-Fi of the system, so that the host can only access to the network by wired connection. However, in this method, the application layer driver is adopted, the host will not automatically turn off the Wi-Fi of the system when accessing to the network, and other applications on the host that need access to the external network may be continuously used, without being affected by the network card, thus improving a network connection flexibility of the host.

(4) The host's own network protocol interface is compatible, and there is no requirement for the network protocol interface of the host, so that the network protocol interface does not need to be modified.

DETAILED DESCRIPTION

The present invention is further explained and described hereinafter with reference to the drawings and specific embodiments.

An application state network card driving method comprises the following steps.

Figure 4:
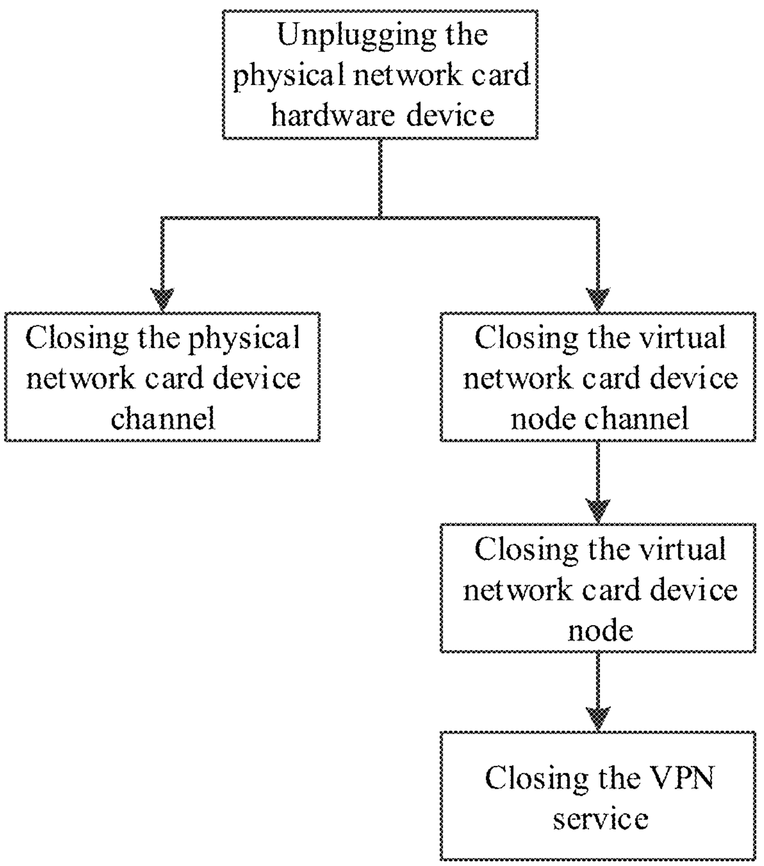
FIG. 4 is a flow chart for deleting the virtual network card device.

A system is initialized, hardware device plugging and unplugging detection may be opened in the process of initializing the system, and subsequent operations are carried out after plugging and unplugging actions of a physical network card hardware device are detected. At this time, the hardware device plugging and unplugging detection is opened, and when the hardware device is detected to be plugged, the hardware device is identified, and after the identification is successful, subsequent operations, such as channel creation and communication, are carried out; and when the hardware device is detected to be unplugged, the hardware device is identified, and after the identification is successful, subsequent operations as shown in FIG. 4 are carried out to delete the virtual network card device.

In fact, trigger conditions of driver installation may be in various forms, such as opening by detecting the plugging of the physical network card hardware device when the system is initialized, and deleting by detecting the unplugging of the physical network card hardware device. The driver installation may also be triggered by other conditions, and the former is selected in this embodiment.

After initialization, a channel communicating with the physical network card hardware device is established, and a virtual network card device channel is established. These two channels may be established in any order, such as establishing the hardware device channel first, or establishing the virtual network card device channel first, or even establishing the two channels at the same time. The establishment of the channel communicating with the physical network card hardware device is the prior art, which will not be described in detail.

Figure 1:
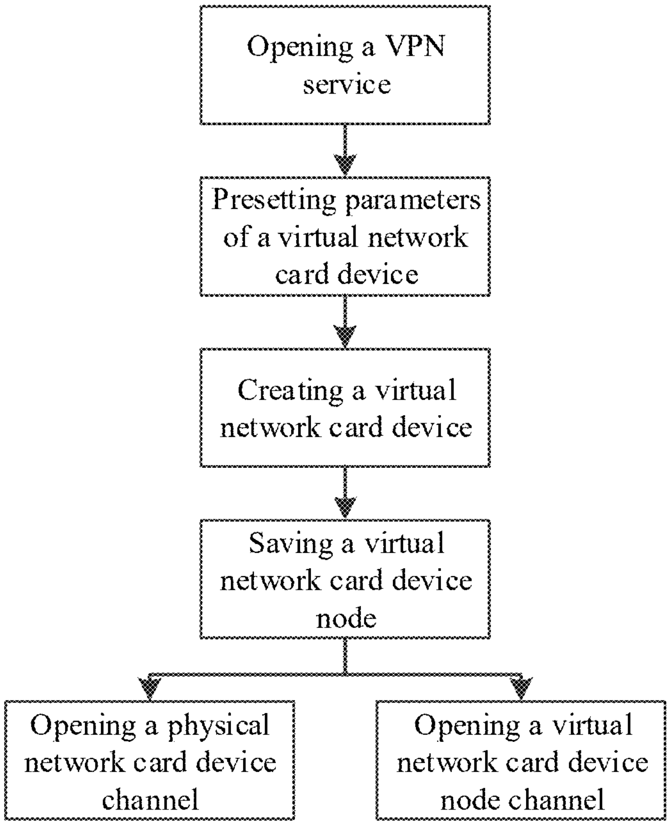
FIG. 1 is a flow chart of creating a virtual network card device.

The step of establishing the virtual network card device channel, as shown in FIG. 1, comprises: opening a VPN service, and calling a function in an internal class of the VPN service to create the virtual network card device. In this embodiment, taking an Android system as an example, a public interface VPNService.Builder in the internal class of the VPN service is called first to preset parameters of the virtual network card device, then a function VPNService-.Builder.Establish( ) in the internal class of the VPN service is called to create the virtual network card device, and a virtual network card device node is saved. After the virtual network card device is successfully created, the system will associate the virtual network card device with a system network, and further communicate with a physical network card by a standard network interface provided by the system network, so that this method is compatible with the standard network interface of the system. In this embodiment, the public interface VPNService.Builder and the function VPN-Service.Builder.Establish( ) in the internal class of the VPN service are called, or the same kind of functions capable of achieving the same function in VPN service may also be used.

The physical network card hardware device channel and a virtual network card device node channel are opened for communication.

A communication process comprises: reading, by the virtual network card device, protocol layer packet data (such as IP) in the virtual network card device node, and transmitting the data to the physical network card hardware device through a network protocol interface module and a device interface module in sequence; and receiving, by the device interface module, the data sent by the physical network card hardware device, transmitting the data to the network protocol interface module, then transmitting the data to the virtual network card device through the network protocol interface module, and writing, by the virtual network card device, the protocol layer packet data into the virtual network card device node to upload to the system network. From the perspective of the whole system, the communication process specifically comprises sending and receiving parts.

Figure 2:
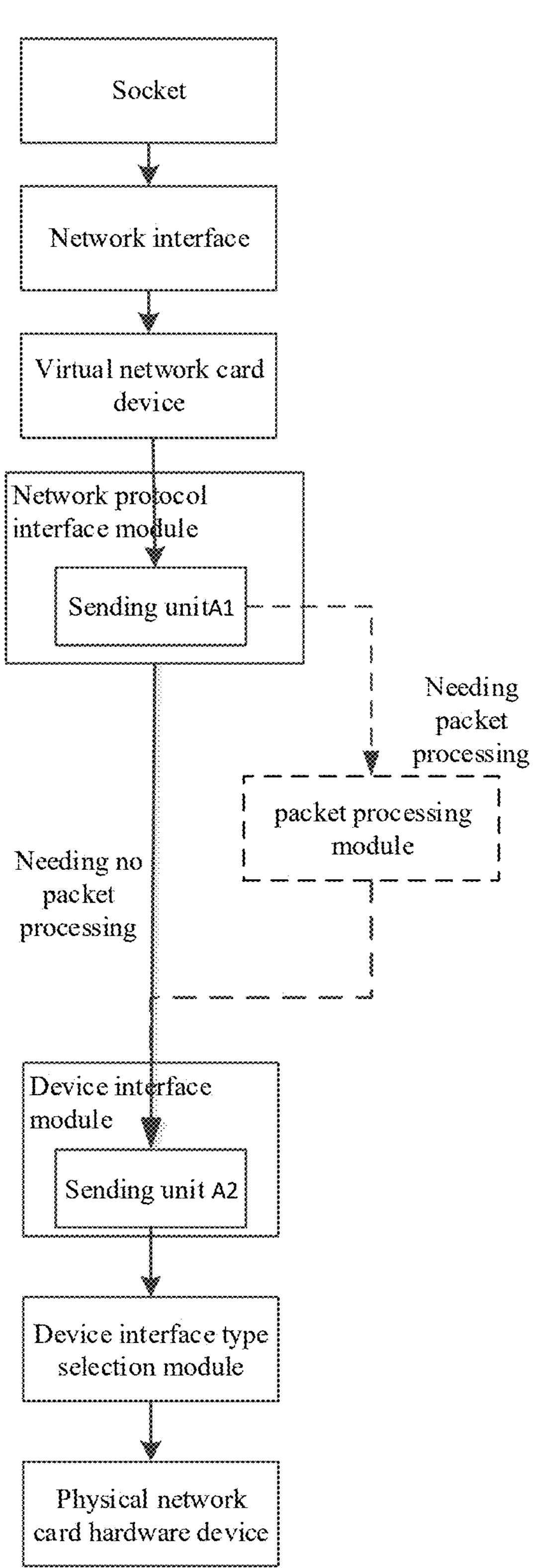
FIG. 2 is a flow chart of a sending process.

(1) Sending process: as shown in FIG. 2, an application program sends application data to the system network first, such as sending in a form of socket. Then, the system network processes the application data to form the protocol layer packet data (such as IP), and writes the protocol layer packet data into the virtual network card device node. After the virtual network card device reads the protocol layer packet data from the virtual network card device node, the data is sent through a sending unit A1 of the network protocol interface module, the sending unit A1 of the network protocol interface module may directly send the data to a sending unit A2 of the device interface module, or the protocol layer packet data may be packaged through a packet processing module first, and then sent to the sending unit A2 of the device interface module. The packet processing module may be selected as required, and is mainly selected according to a type of data to be transmitted by the physical network card hardware device. Finally, the data is sent to the physical network card hardware device through the sending unit A2 of the device interface module. When a physical interface type of the physical network card hardware device has a compatibility requirement, a device interface type selection module may be added to select a corresponding data transmission mode for communication according to the physical interface type.

Figure 3:
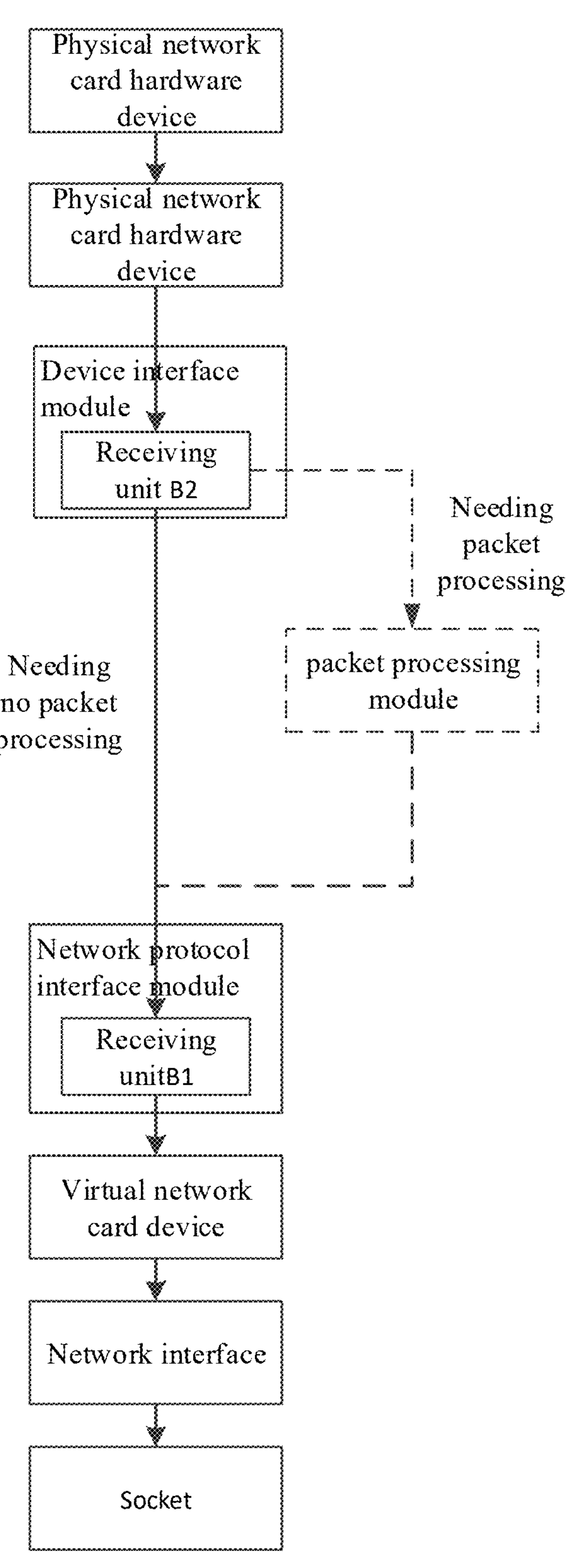
FIG. 3 is a flow chart of a receiving process.

(2) Receiving process: as shown in FIG. 3, the physical network card hardware device receives network data first, and then sends the data to a receiving unit B2 of the device interface module, or sends the data to the receiving unit B2 of the device interface module through the device interface type selection module, which depends on whether the physical interface type has the compatibility requirement. Then, the receiving unit B2 of the device interface module directly transmits the data to a receiving unit B1 of the network protocol interface module, or parses the data through the packet processing module first, and then transmits the data to the receiving unit B1 of the network protocol interface module, which depends on whether the data sent by the physical network card hardware device is the protocol layer packet data. If the data is the protocol layer packet data, the data may be directly transmitted, and if the data is not the protocol layer packet data, the data needs to be parsed into the protocol layer packet data to be sent. Then, the receiving unit B1 of the network protocol interface module transmits the protocol layer packet data to the virtual network card device, and the virtual network card device writes the protocol layer packet data into the virtual network card device node to upload to the system network. Finally, the system network processes the data, and then sends the data to the application program, such as sending in a form of socket.

The packet processing module may only work in the sending process, and may only work in the receiving process, or may work in both the sending and receiving processes, which may be flexibly selected as required.

The virtual network card device is deleted, which comprises: closing the physical network card hardware device channel and the virtual network card device node channel to stop communication, calling a node closing function ParcelFileDescriptor interface close( ) in system functions to close the virtual network card device node, and calling a service closing function stopService( ) in the system functions to close the VPN service.

Figure 5:
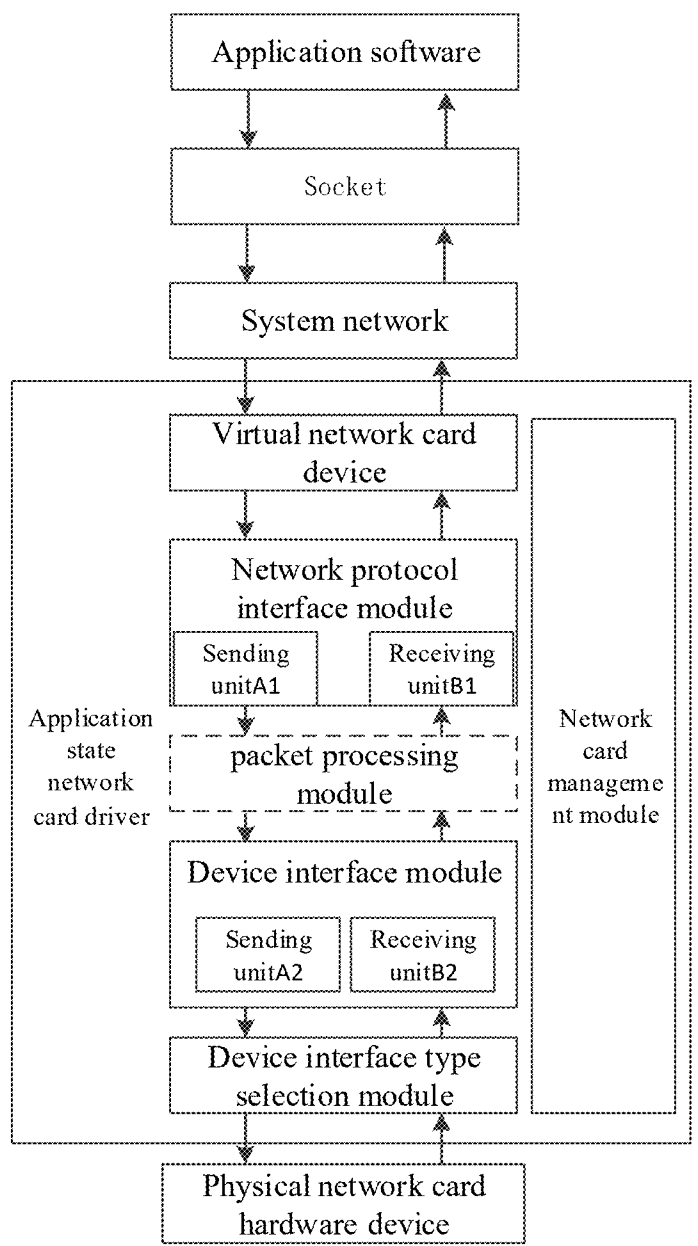
FIG. 5 is an architecture diagram of an application state network card driving apparatus.

An application state network card driving apparatus, as shown in FIG. 5, comprises the following program modules.

A network card management module is configured for establishing a channel communicating with a physical network card hardware device, controlling a virtual network card device creation module to work, controlling a virtual network card device deletion module to work, controlling a network protocol interface module to work, controlling a device interface module to work, and opening the physical network card hardware device channel and a virtual network card device node channel. In this embodiment, the hardware device needs to be subjected to plugging and unplugging detection and identification when a system is initialized, and the network card management module is further configured for detecting the plugging and unplugging of the physical network card hardware device and identifying the physical network card hardware device.

The virtual network card device creation module is configured for opening a VPN service, calling a public interface in an internal class of the VPN service to preset parameters of a virtual network card device, calling a function in the internal class of the VPN service to create the virtual network card device, and saving a virtual network card device node.

The virtual network card device deletion module is configured for stopping node communication of the virtual network card device, calling a node closing function in system functions to close the virtual network card device node, and calling a service closing function in the system functions to close the VPN service.

The virtual network card device is configured for downstream transmitting protocol layer packet data sent by a system network, and uploading the data transmitted by the network protocol interface module to the system network.

The network protocol interface module is configured for downstream transmitting the protocol layer packet data transmitted by the virtual network card device, and uploading the data transmitted by the device interface module to the virtual network card device.

The device interface module is configured for downstream transmitting the data transmitted by the network protocol interface module to the physical network card hardware device, and uploading the data sent by the physical network card hardware device.

When the physical network card hardware device sends the protocol layer packet data, the above driving apparatus may be directly used. In the case of non-protocol layer packet data, such as MAC layer data, the driving apparatus further comprises a packet processing module, and the packet processing module is configured for packaging the protocol layer packet data downstream transmitted through the network protocol interface module, and outputting the non-protocol layer packet data, such as MAC layer data, for transmission to the physical network card hardware device; and parsing the non-protocol layer packet data uploaded through the device interface module, and obtaining the protocol layer packet data for uploading to the virtual network card device through the network protocol interface module.

When the physical interface between the host and the physical network card hardware device is in a fixed type, the device interface module in the driving apparatus may directly transmit the data to the physical interface. If the driving apparatus needs an interface compatible with various types of physical network card hardware devices, the driving apparatus further comprises a device interface type selection module configured for, according to a physical device interface type of the physical network card hardware device, selecting a corresponding data transmission mode for communication.

What is claimed is:

1. An application state network card driving method, comprising the following steps of:

initializing a system;

establishing a physical network card hardware device channel;

creating a virtual network card device, which comprises: opening a VPN service, calling a public interface in an internal class of the VPN service to preset parameters of the virtual network card device, calling a function in the internal class of the VPN service to create the virtual network card device, and saving a virtual network card device node;

opening the physical network card hardware device channel and a virtual network card device node channel;

carrying out data communication between the system and a physical network card hardware device, which comprises: reading, by the virtual network card device, protocol layer packet data in the virtual network card device node, and transmitting the data to the physical network card hardware device through a network protocol interface module and a device interface module in sequence; and receiving, by the device interface module, the data sent by the physical network card hardware device, transmitting the data to the network protocol interface module, then transmitting the data to the virtual network card device through the network protocol interface module, and writing, by the virtual network card device, the data into the virtual network card device node; and deleting the virtual network card device, which comprises: closing the physical network card hardware device channel and the virtual network card device node channel, calling a node closing function in system functions to close the virtual network card device node, and calling a service closing function in the system functions to close the VPN service; wherein the process of initializing the system comprises: opening hardware device plugging and unplugging detection, when the physical network card hardware device is detected to be plugged, identifying the physical network card hardware device, and when the identification is successful, carrying out subsequent operations; and when the physical network card hardware device is detected to be unplugged, identifying the physical network card hardware device, and when the identification is successful, carrying out subsequent operations.

2. The application state network card driving method according to claim 1, wherein, in a communication process, the protocol layer packet data is in transparent transmission among the virtual network card device, the network protocol interface module, the device interface module and the physical network card hardware device.

3. The application state network card driving method according to claim 1, wherein a communication process further comprises at least one of the following situations:

after the virtual network card device reads the protocol layer packet data in the virtual network card device node, the protocol layer packet data is downstream transmitted through the network protocol interface module, the protocol layer packet data is packaged first, and then the packaged data is transmitted to the physical network card hardware device through the device interface module; and when the data transmitted by the physical network card hardware device is non-protocol layer packet data, the non-protocol layer packet data is uploaded through the device interface module, the non-protocol layer packet data is parsed into the protocol layer packet data first, and then the protocol layer packet data is transmitted to the virtual network card device through the network protocol interface module.

4. The application state network card driving method according to claim 1, further comprising: in a communication process, according to a physical device interface type of the physical network card hardware device, selecting a corresponding data transmission mode for communication.

5. The application state network card driving method according to claim 1, wherein, when the method is applied to an Android system, in the process of creating the virtual network card device, VPNService.Builder which is the public function of the internal class of the VPN service is called to preset the parameters of the virtual network card device, and VPNService.Builder.Establish( ) which is the function of the internal class of the VPN service is called to create the virtual network card device.

6. The application state network card driving method according to claim 1, wherein, in the process of deleting the virtual network card device, the node closing function adopts ParcelFileDescriptor interface close( ) in the system functions, and the service closing function adopts stopService( ) in the system functions.

7. An application state network card driving apparatus, comprising:

a memory storing instructions that, when executed by the at least one processor, cause the at least one processor to:

control a creation module to work, control a deletion module to work, control a interface module to work, control a interface module to work, establish a physical network card hardware device channel, and open the physical network card hardware device channel and a virtual network card device node channel;

open a VPN service, calling a public interface in an internal class of the VPN service to preset parameters of a virtual network card device, call a function in the internal class of the VPN service to create the virtual network card device, and save a virtual network card device node;

stop node communication of the virtual network card device, call a node closing function in system functions to close the virtual network card device node, and call a service closing function in the system functions to close the VPN service;

downstream transmit protocol layer packet data written by a system network into the virtual network card device node, and upload the protocol layer packet data transmitted by the network protocol interface to the system network;

downstream transmit the protocol layer packet data transmitted by the virtual network card device, and upload the data transmitted by the device interface to the virtual network card device; and downstream transmit the data transmitted by the network protocol interface to the physical network card hardware device, and upload the data sent by the physical network card hardware device.

8. The application state network card driving apparatus according to claim 7, wherein the instructions, when executed by the at least one processor, further cause the at least one processor to perform at least one of the following steps of:

packaging the protocol layer packet data downstream transmitted through the network protocol interface, and outputting non-protocol layer packet data; and parsing the non-protocol layer packet data uploaded through the device interface, and obtaining the protocol layer packet data.

9. The application state network card driving apparatus according to claim 7, wherein the instructions, when executed by the at least one processor, further cause the at least one processor to, according to a physical device interface type of the physical network card hardware device, select a corresponding data transmission mode for communication.

10. The application state network card driving apparatus according to claim 7, wherein instructions, when executed by the at least one processor, are further configured to cause the at least one processor to detect the plugging and unplugging of the physical network card hardware device and identify the physical network card hardware device.

* * * * *